June 22, 1943.   G. F. WALD   2,322,607
CONTINUOUS SUPPLY REEL FOR WIRE PROCESSING MACHINES
Filed July 14, 1941

Inventor:
GEORGE F. WALD,
by John E. Jackson
his Attorney.

Patented June 22, 1943

2,322,607

UNITED STATES PATENT OFFICE 2,322,607

CONTINUOUS SUPPLY REEL FOR WIRE PROCESSING MACHINES

George F. Wald, North Olmstead, Ohio, assignor to The American Steel and Wire Company of New Jersey, a corporation of New Jersey Application July 14, 1941, Serial No. 402,343

6 Claims. (Cl. 242—128)

The present invention provides an improved apparatus for continuously supplying wire to various processing treatments such as galvanizing, tinning or annealing, the apparatus being designed to supply the wire smoothly and free from kinks or other distortion.

A further object of the invention is to provide a wire-supplying apparatus which is continuous in its operation and which enables bundles of wire to be secured together readily for such continuous operation.

Further objects and advantages will become apparent as the description proceeds, and the features of novelty will become apparent as the description proceeds.

The invention will be understood more readily from a consideration of the accompanying drawing, wherein Figure 1 represents a side elevation of one form of an apparatus embodying the features of the present invention;

Figure 1:
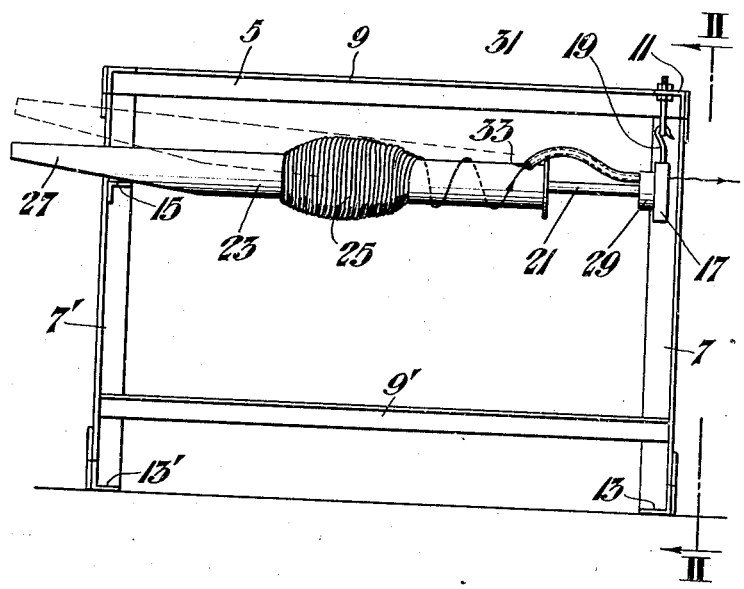
Figure 2:
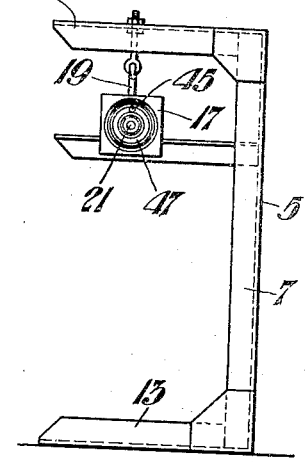
Figure 2 is an end elevation of the apparatus of Figure 1, the view being taken on the line II—II of Figure 1 looking in the direction of the arrows.
Figure 3:
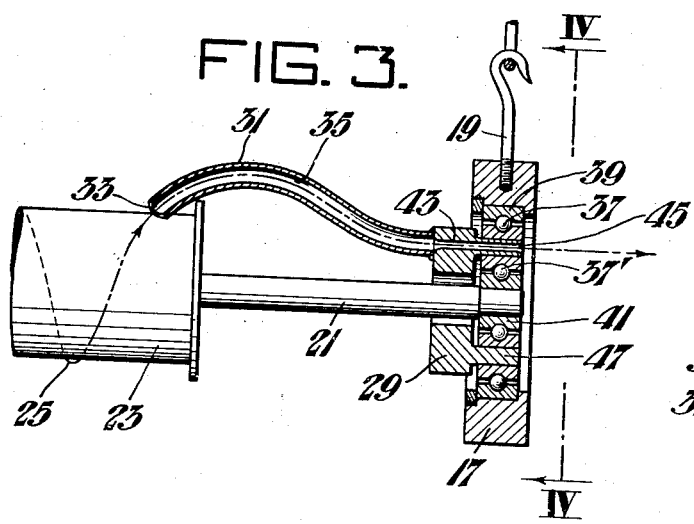
Figure 3 is a sectional elevation showing details of construction of the wire-feeding apparatus.
Figure 4:
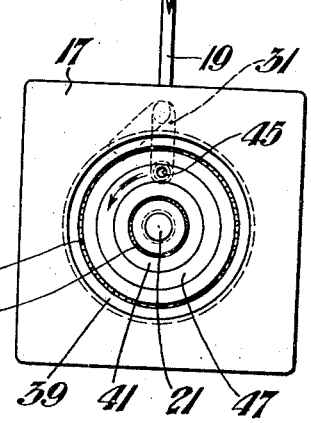
Figure 4 is an enlarged end elevation taken on the line IV—IV of Figure 3.

Referring more particularly to the drawing, the apparatus of this invention embraces a frame 5 which is shown as comprising vertical end beams 7, 7', and horizontal longitudinal beams 9, 9'. The frame stands on front and rear beams 13, 13' which extend horizontally from the uprights 7 and 7' at substantially right angles thereto.

A similar bar 11 also extends horizontally from the upright 7 and a similar bar 15 also extends horizontally from the upright 7'. This bar 11 forms mounting means for the housing 17, which will be referred to in greater detail hereinafter, the housing 17 being shown as being suspended from the bar 11 by means of a hook 19.

Also mounted in the housing 17 is a bar 21 which carries a reel 23, the reel carrying a coil of wire 25, and terminating in a tapered handle portion 27. The handle 27 extends beyond the limits of the frame 5 in order to be readily accessible and normally rests on the horizontal bar 15. The mounting of the reel-bar 21 in the housing 17 and the free suspension of this housing permits the handle 27 of the reel 23 to be lifted for slipping another coil of wire onto the reel.

Also mounted in the housing 17 is an annular collar 29 through which reel-bar 21 extends. This collar 29 carries a tubular planetary wire-carrier arm 31, the outer end of which is provided with an opening 33 which communicates with the tube 35 extending through the arm 31. This arm is provided with a curvature having a radius sufficiently long to cause the arm 31 to revolve concentrically around the reel 23.

The collar 29 is mounted in annular bearings 37, 37', the outer race 39 of bearing 37 being stationary, as is the inner race 41.

The collar 29 has a hole 43 extending through it, this hole registering with the tubular hole 33 in the arm 31, and with a hole 45 which extends completely through a flange 47, which flange forms the mounting for the collar 29 in the bearing. The flange 47 is shown as extending all the way through the bearing assembly.

In operation, a bundle of wire is placed on the reel 23 at the handle end 27, which end then is lifted from its rest 15 which enables the bundle to be moved along the reel until it is in the position shown in the drawing. The first end of the bundle then is threaded through the hole 33 and through the tube 35 in the arm 31, and finally through holes 43 and 45.

As the threaded wire is pulled forwardly, the planetary arm 31 revolves rapidly around the reel 23, causing the wire to be played out smoothly and under continuous constant tension and free from kinks and other deformations.

As the first bundle of wire becomes withdrawn from the reel sufficiently, a second bundle of wire is placed on the end of the reel, and the first end of the second bundle is welded on to the last end of the first bundle, and the operations repeated. Thus, the reel is made continuous in its operation.

I claim:

1. Mechanism for holding and unwinding bundles of wire which comprises the combination with a supporting frame, of a reel mounted on the frame adapted to receive bundles of wire thereon for unwinding therefrom, suspension means for freely suspending one end of the reel from the frame, a rest for the reel adjacent to its loading end, the said loading end defining means enabling the reel to be lifted from its rest for loading with bundles of wire, unwinding mechanism for unwinding wire from the bundles including a planetary tubular arm through which the wire passes, the said arm being off-set from the reel and provided with a radius curvature, and mounting means for the arm enabling the said arm to revolve around the reel responsive to the wire being pulled through the said arm.

2. Mechanism for holding and unwinding bundles of wire which comprises the combination with a supporting frame, of a reel mounted on the frame adapted to receive bundles of wire thereon for unwinding therefrom, means for yieldably mounting the reel on the frame, a rest for the reel adjacent to its loading end, which loading end defines means enabling the reel to be lifted from its rest sufficiently to receive bundles of wire, unwinding mechanism for unwinding wire from the bundles including wire feeding and guiding means, and mechanism for causing operation of the said means responsively to a pulling force exerted on the unwound portion of the wire.

3. Mechanism for holding and unwinding bundles of wire which comprises the combination with a supporting frame, of a reel mounted on the frame adapted to receive bundles of wire thereon for unwinding therefrom, means for yieldably mounting the reel on the frame, a rest for the reel adjacent to its loading end, which loading end defines means enabling the reel to be lifted from its rest sufficiently to receive bundles of wire, and unwinding and guiding mechanism for unwinding wire from the bundle responsively to sufficient pull being exerted on previously unwound portions of the wire carried by the said mechanism.

4. Mechanism for holding and unwinding bundles of wire, which comprises the combination with a supporting frame of a reel adapted to receive successive bundles of wire and to hold a plurality thereof for continuous operation of a stationary bar for immovably supporting the reel, a tubular planetary wire carrier adapted to receive wire from the bundles, and mounting means suspended from the frame for revolvably mounting the said wire carrier for revolving around the reel and the stationary supporting bar thereof, the said reel directly supporting the total weight of each bundle of wire placed thereon and having its forward end mounted in the said mounting means with its rearward end held on a portion of the supporting frame, the said wire carrier and mounting means being adapted to receive wire threaded therethrough from the bundles.

5. Mechanism for holding and unwinding bundles of wire, which comprises the combination with a supporting frame and stationary reel having a forward end and a rear end and being adapted to receive successive bundles of wire and to hold a plurality thereof for continuous unwinding operation of a stationary bar supporting the reel at the forward end thereof, a tubular planetary wire-supply arm adapted to receive wire threaded therethrough from the reel, a housing suspended from the supporting frame, bearing means in the housing for the said arm, means in the housing for receiving the said bar and for suspending the reel from the frame, and means for mounting the arm in the housing, the said means having an opening therethrough communicating with the opening in the said arm to enable passage of the wire through the arm and mounting means, the said arm being off-set with respect to the reel, so that a pull exerted on the wire will cause the arm to revolve around the reel and the stationary supporting bar thereof for feeding wire uniformly therefrom, the reel directly supporting the total weight of each bundle of wire placed thereon.

6. Mechanism for holding and unwinding bundles of wire, which comprises the combination with a supporting frame, of a stationary reel mounted on the frame adapted to receive bundles of wire thereon for continuous unwinding operation, a stationary bar supporting the reel, suspension means for suspending the bar from the frame, a tubular planetary wire-supply arm adapted to receive wire threaded therethrough from the reel, the said arm being off-set from the reel and being revolvable around the reel responsively to the threaded wire being pulled, and mounting means for the said arm enabling the arm to revolve around the said reel and the stationary supporting bar thereof, the said reel directly supporting the total weight of each bundle of wire placed thereon.

GEORGE F. WALD.